United States Patent [19]

Shirai et al.

[11] 4,299,311
[45] Nov. 10, 1981

[54] DISC BRAKE

[75] Inventors: Kenji Shirai, Susono; Minoru Takeuchi, Nagoya, both of Japan

[73] Assignee: Toyota Jidosha Kogyo Kabushiki Kaisha, Toyota, Japan

[21] Appl. No.: 96,972

[22] Filed: Nov. 23, 1979

[30] Foreign Application Priority Data

Jun. 29, 1979 [JP] Japan .................................. 54-82512

[51] Int. Cl.³ .................... F16D 55/224; F16D 63/00; F16D 65/14
[52] U.S. Cl. .................................. 188/70 R; 188/71.1; 188/106 P; 188/218 XL; 192/65; 92/83; 188/73.43
[58] Field of Search .................... 188/70R, 71.1, 72.1, 188/72.4, 72.5, 72.7, 74, 73.3, 106 P, 218 XL; 192/65, 83, 85 C, 107 T

[56] References Cited
U.S. PATENT DOCUMENTS

| 3,146,859 | 9/1964 | Schmid | 188/70 R |
| 3,941,216 | 3/1976 | Burgdorf | 188/72.4 |
| 3,983,969 | 10/1976 | Colpaert et al. | 188/72.4 X |

FOREIGN PATENT DOCUMENTS

| 639843 | 5/1962 | Italy | 188/74 |
| 631714 | 11/1978 | U.S.S.R. | 188/72.1 |

Primary Examiner—Jeffrey V. Nase
Attorney, Agent, or Firm—Kane, Dalsimer, Kane, Sullivan & Kurucz

[57] ABSTRACT

A disc brake comprises a rotatable brake disc, and a pad assembly disposed in opposed relation to the pressure bearing surface of the brake disc. The pressure bearing surface of the brake disc is inclined diametrically thereof, and the pad assembly is adapted to displace diametrically of the brake disc so as to engage the pressure bearing surface of the brake disc, whereby there is provided a clearance between the press surface of the pad assembly and the brake disc, which clearance is large enough to prevent the dragging phenomenon.

9 Claims, 10 Drawing Figures

DISC BRAKE

BACKGROUND OF THE INVENTION

1. Field of the invention

This invention relates to a disc brake, and more particularly to a disc brake device for a vehicle, with the freedom of a dragging phenomenon which has ever arisen with a prior art device upon releasing the brakes.

2. Description of the prior art

A disc brake is known, which has caliper slidable in parallel to the axis of rotation of a brake disc. This type disc brake has been such that a pair of pad assemblies are supported on the opposite sides of the brake disc slidably along the axis parallel to the axis of rotation of the brake disc. The pair of pad assemblies are urged toward the brake disc into frictional engagement with the opposite side surfaces of the brake disc by operation of a piston incorporated in the caliper and reaction thereof, thereby applying a braking action to the brake disc. When the piston is released from the operative state, the frictional engagement of the pair of pad assemblies with the brake disc is released by the resilient returning force of retraction seal members disposed between the caliper and the piston.

In the prior art disc brake, the pressure bearing opposite surfaces of the brake disc make a right angle with respect to the axis of rotation of the brake disc, and the pair of pad assemblies are movable only along a path parallel to the axis of rotation of the disc. Furthermore, movement in a direction to release the braking action, of the pair of pad assemblies has been dependent on the resilient returning force alone of the retraction seal members. However, the retraction stroke of the seal members could not be large enough to return the pair of pad assemblies from the engaging position with the pressure-bearing opposite side surfaces of the brake disc to their home positions. For this reason, dragging phenomenon has very often arisen with the prior art disc brake. The dragging phenomenon causes an increased consumption of fuel of the vehicle, and leads to a squelch groan which is an unusual sound of the brakes.

SUMMARY OF THE INVENTION

It is accordingly an object of the present invention to provide a disc brake which is free from a dragging phenomenon upon releasing the brakes.

To attain this object, there is provided according to the present invention a disc brake, wherein the pressure bearing surface of a rotatable brake disc, to which a braking action is applied by a pad assembly, is diagonal inclined, a press surface of the pad assembly which is engageable with the inclined pressure bearing surface of the brake disc, is substantially parallel to the aforesaid inclined pressure bearing surface; and the pad assembly is adapted to be displaced toward the pressure bearing surface of the brake disc as well as in a nonparallel direction thereof.

Since, according to the present invention, the pad assembly is movable nonparallel to the brake disc having the diagonally inclined pressure receiving surface, displacement of the pad assembly in the nonparallel direction of the disc provides a clearance between the press surface of the pad assembly and the pressure receiving surface of the brake disc, which clearance is large enough to prevent the dragging of the brakes, which would be caused upon releasing the braking action.

BRIEF DESCRIPTION OF THE DRAWINGS

FIG. 5 through 10 are fragmentary cross sectional views of the brake discs and pad assemblies of other embodiments, wherein: FIGS. 6 and 7 are fragmentary cross sectional view of the second operating means according to another embodiment; FIG. 8 is a view similar to FIG. 1, showing a further embodiment of the present invention; and FIG. 9 is a front view of a support member of the disc brake shown in FIG. 8.

DESCRIPTION OF THE PREFERRED EMBODIMENTS

Figure 1:
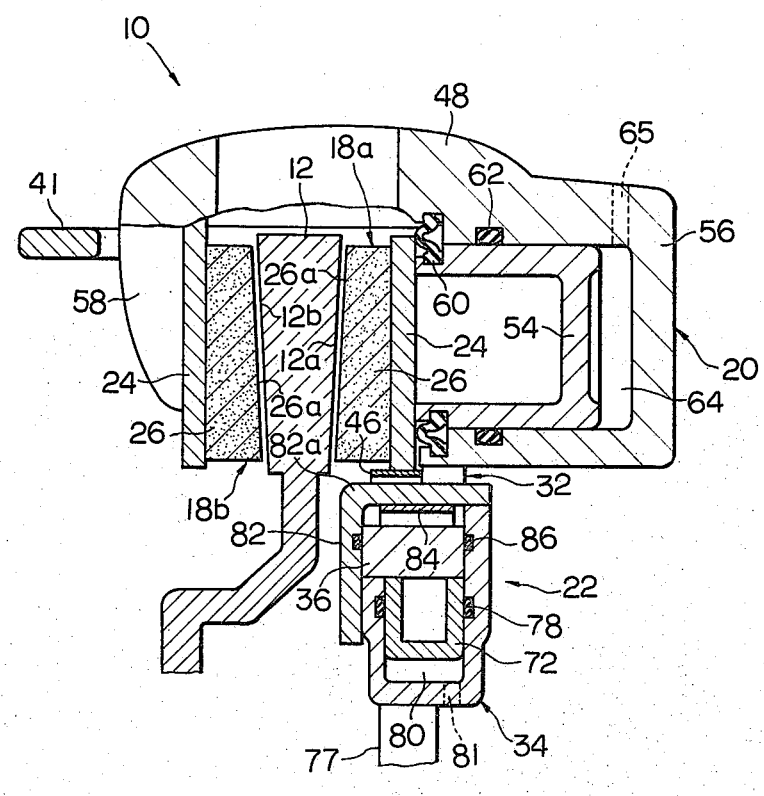
FIG. 1 is a cross sectional view of a disc brake according to the present invention.

A disc brake according to the present invention is generally denoted by a reference numeral 10 in FIG. 1. The disc brake 10 includes; a brake disc 12 having the circular pressure-receiving surfaces 12a and 12b at the opposite sides thereof; a pair of pad assemblies 18a and 18b disposed in opposed relation to the pressure receiving surfaces 12a and 12b of the disc; a first operation means 20 for urging the pad assemblies toward or away from the pressure-receiving surfaces 12a and 12b of the disc; and a second operation means 22 for urging the pair of pad assemblies 18a and 18b nonparallel to the brake disc 12.

The brake disc 12 has a rotary shaft (not shown) rotatable integrally with an axle, as is well known, and the wall thickness of the disc 12 is increased diametrically outward thereof. Thus, the brake disc 12 presents a diagonally outwardly divergent cross section, which makes an angle of elevation with respect to respective pressure-receiving surface 12a or 12b. An angle of inclination $\theta$ of respective pressure-receiving surface 12a(12b) is in the range of 3° to 6°, and preferably at 4°.

Figure 2:
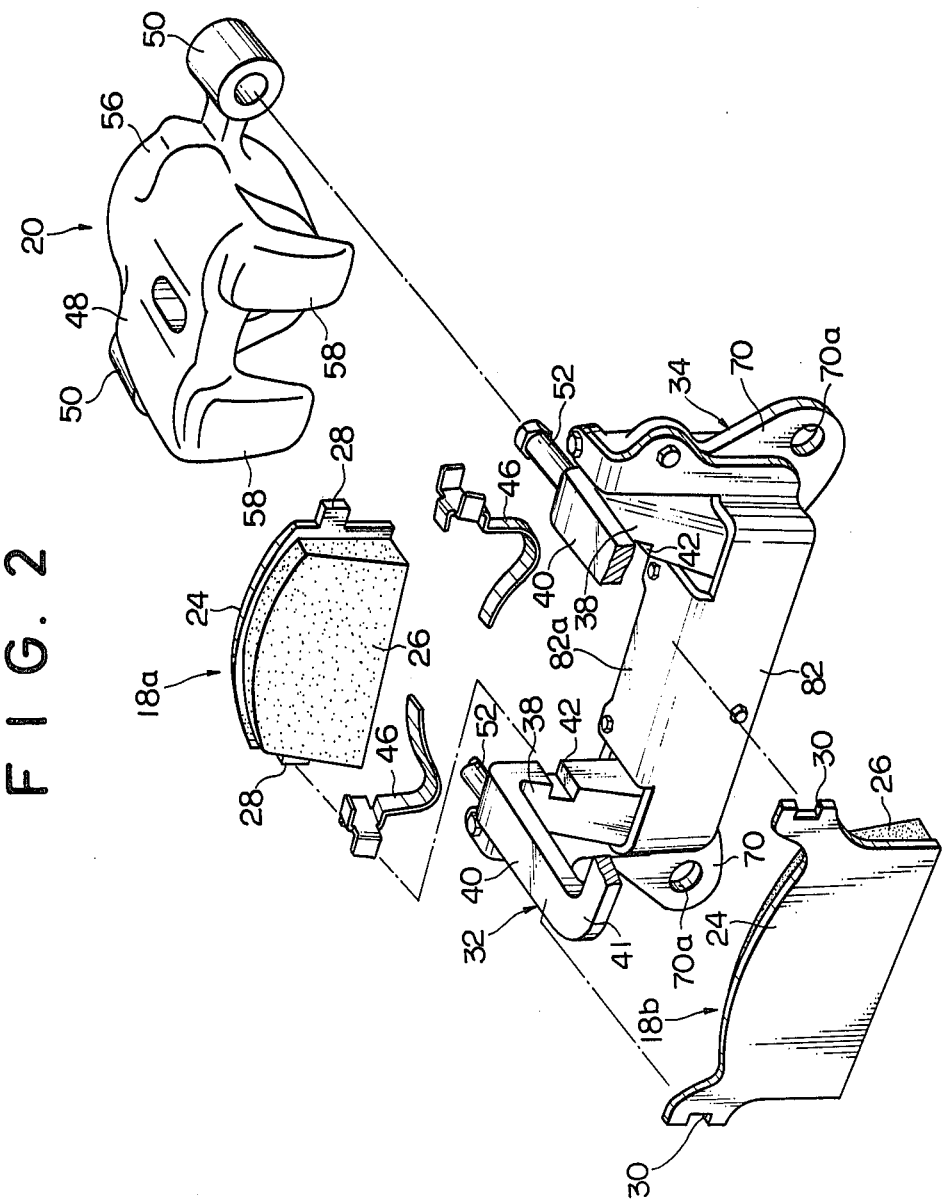
FIG. 2 is an exploded perspective view of the disc brake of FIG. 1.

Each pad assembly 18a(18b) includes back metal 24 and a friction member 26 attached to the back metal 24. Each friction member 26 increases in thickness from the top to the bottom, as viewed in FIG. 1, in a manner that respective press surfaces 26a thereof opposing the pressure-receiving surfaces 12a and 12b of the brake disc 12, respectively, are in parallel thereto, as seen in FIG. 1. As is best seen in FIG. 2, rectangular lugs 28 project from the opposite sides of the back metal 24 of one pad assembly 18a, and in turn, inverted U-shaped engaging portions 30 are provided in the upper side lugs of the back metal 24 of the other pad assembly 18b.

The pair of pad assemblies 18a and 18b are carried by a support member 32, which is supported through the medium of a fixing member 34 on a vehicle body (not shown).

Figure 3:
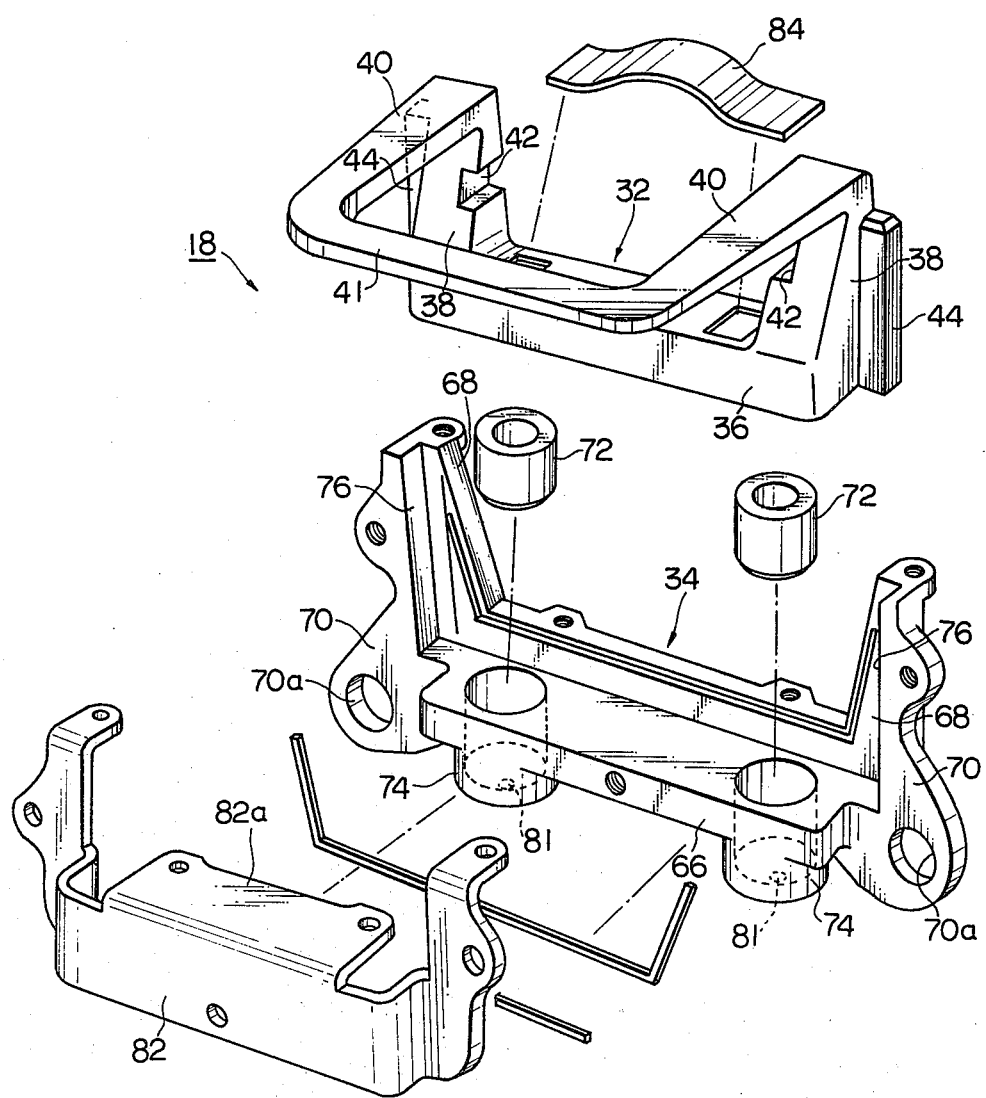
FIG. 3 is an exploded perspective view of an assembly of a support member and a fixing member of FIG. 2.

The support member 32, as best seen in FIG. 3, includes a base frame portion 36, side frame portions 38 upright from the opposite ends of the base frame portion 36 integrally therewith, and a U-shaped frame portion consisting of a pair of opposing outer pad guide portions 40 extending horizontally from the top ends of respective side frame portions 38 at a right angle thereto and a bridge portion 41 associated with these outer pad guide portions 40. The opposing inner walls of the side frame portions 38 are provided with inner pad guide grooves 42 running in parallel to the outer pad guide portions 40. Guide rails 44 extend lengthwise of the side frame portions 38 on the outer wall portions thereof. The inner pad guide grooves 42 receive the rectangular lugs 28 of the inner pad assembly 18a through the medium of known anti-rattle springs 46, so that the friction member 26 of the inner pad assembly 18a may be carried by the outer pad guide members 40. Thus, the inner pad assembly 18a may be carried by the support member 32 slidably at a right angle with respect to the side frame portions 38 of the support member. The outer pad assembly 18b is supported by the support member 32, with the friction member 26 thereof opposing the friction member 26 of the inner pad assembly 18a and the engaging portion 30 thereof fitted on the inner peripheral wall of the outer pad guide portions 40. The outer pad assembly 18b is thus allowed to slide at a right angle with respect to the side frame portions 38.

The pair of pad assemblies 18a and 18b slidably carried by the support member are disposed on the opposite sides of the brake disc 12, as seen in FIG. 1. The first operation means 20 for moving the pair of pad assemblies 18a and 18b is combined with the support member 32. The first operation means includes caliper 48, which comprises a pair of boss portions 50 on the opposite sides thereof. A guide pin 52 projects from the upper end portion of each side frame portion 38 of the support member 32 in a direction opposite the longitudinal direction of each outer pad guide portion 40, each guide pin being fitted in the boss portion 50 of the caliper 48. The caliper 48 is thus slidably carried by means of the boss portions 50 by the support member 32.

The caliper 48 include a cylinder portion 56 housing therein a piston 54 engageable with the back metal 24 of one pad assembly, namely the inner pad assembly 18a, and a pair of press portions 58 positioned on the opposite side of the cylinder portion 56 and engageable with the back metal 24 of the other pad assembly, namely the outer pad assembly 18b. Dust-tight seal member 60 of the known type is provided between the cylinder portion 56 and the piston 54, and known retraction seal member 62 is provided in the inner wall of the cylinder portion 56, along which the piston is slidingly moved. A pressurized oil is supplied by way of an oil pressure port 65 into an oil chamber 64 defined in the cylinder portion 56. When the pressurized oil is supplied to the chamber, the piston 52 is moved to a position projecting from the cylinder. When supply of the pressurized oil to the oil pressure chamber 64 is released, the piston 52 is returned to its home position by the known retraction action of the seal member 62.

The support member 32 which carries the pair of pad assemblies 18a and 18b as well as the caliper 48 is supported on the vehicle body by means of the fixing member 34. The fixing member 34, as best seen in FIG. 3, includes a base frame portion 66, and opposing side frame portions 68 upright from the ends of the base frame portion. The side frame portions 68 have flanges 70 extending outward and lengthwise thereof, respectively. The base frame portion 66 is provided with cylinders 74, in each of which a piston 72 is to be housed. In the opposing inner walls of the upright side frame portions 68 are provided guide grooves 76 for receiving therein the guide rails 44 of the side frame portions 38 of the support member 32 in a manner to allow the sliding motion. Thus, the support member 32, in which the pair of pad assemblies 18a and 18b and the caliper 48 are incorporated, is supported by the fixing member 34 slidably in the longitudinal direction of the side frame portions 38. The fixing member 34 is attached to knuckle 77 (FIG. 1) of the vehicle body by fastening means, such as bolts and nuts (not shown), piercing through holes 70a provided in the flanges 70, in a manner that a direction of the sliding motions of the pair of pad assemblies 18a and 18b makes parallel to the axis of rotation of the brake disc 12, stated otherwise, the direction of the sliding motion of the support member 32 makes a right angle with respect to the axis of rotation of the brake disc.

The cylinders 74 and the pistons 72 housed in respective cylinders constitute a second operation means for sliding the support member 32. In the inner peripheral wall of respective cylinders 74, there are provided known oil seals 78, as seen in FIG. 1. The top face of each piston 72 is engageable with the under surface of the base frame portion 36 of the support member 32. An oil pressure chamber 80 defined by the piston 72 in the lower portion of each cylinder is communicated by way of an oil pressure port 81 to a pressurized oil supply line (not shown) leading to the oil pressure chamber 64 in the first operation means 20. The pressurized oil is supplied into the oil pressure chamber 80 in the second operation means, simultaneously with supply of the pressurized oil into the oil pressure chamber 64 in the first operating means, whereby the pair of pistons 72 are operated to shift the support member 32 diametrically outward of the brake disc 12.

With a view to preventing the support member 32 from springing out of the fixing member 34 by the stroke of the pistons 72 as well as regulating the stroke of the support member 32, a cover 82 is provided for the fixing member 34. Disposed between the under surface of a ledge portion 82a of the cover 82 and the top surface of the base frame portion 36 of the support member 32 is a leaf spring 84 for returning the support member 32 to its home position, upon release of supply of pressurized oil to the oil pressure chamber 80. Dust seals 86 are provided between the base frame portion 36 of the support member 32 and the fixing member 34, and between the base frame portion 36 and the cover 82.

Operation of the disc brake 10 will be referred to in conjunction with FIG. 1. When the oil pressure is transmitted by way of the pressurized oil supply line to the oil pressure chambers 64 and 80 in the first and second operating means 20 and 22 by treading on a known brake pedal, the pistons 54 and 72 in respective operating means will be moved to the projecting position.

Referring first to the operation of the first operation means 20, the piston 54 urges the inner pad assembly 18a toward one pressure bearing surace 12a of the brake disc 12 along the first path parallel to the axis of rotation of the brake disc. By the reaction of the piston 54, the press portions 58 of the caliper 48 urge the outer pad assembly 18b toward the other pressure bearing surface 12b of the brake disc 12 along the first path.

Figure 4:
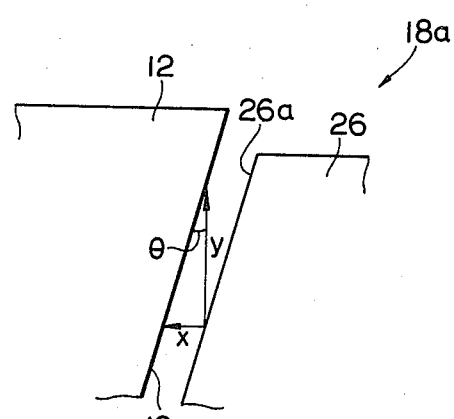
FIG. 4 is a fragmentary enlarged view of the disc brake of FIG. 1.

Referring to the operation of the second operating means 22, the pistons 72 are operated to urge the support member 32 in a path nonparallel to the axis of rotation of the brake disc 12, whereby the caliper 48 and the pair of pad assemblies 18a and 18b supported by the support member 32 are displaced nonparallel to the axis of rotation of the brake disc 12. In this connection, the shift of the pair of pad assemblies 18a and 18b along the second path making a right angle with respect to the first path reduces the clearances between the press surfaces 26a of the pad assemblies and the pressure bearing surfaces 12a of the brake disc 12. The substantial displacement of the pad assemblies toward the brake disc 12 is thus achieved. More specifically, as is diagramatically shown in FIG. 4, taking in view the fact that each pressure bearing surface of the brake disc 12 is tilted at an angle of inclination $\theta$, and if y is representative of displacement of each pad assembly 18a(18b) diagonally outward of the disc along the second path (preferably on the order of 3 mm which is a length of stroke of the piston 72), then the pad assemblies 18a and 18b will be displaced toward the brake disc 12 by a distance equivalent to y·tan $\theta$.

When supply of the pressurized oil is released, the pair of pad assemblies 18a and 18b are urged away from the brake disc 12 along the first path under the resilient returning force of the retraction seal members 62 of the first operation means 20. At the same time, the pair of pad assemblies 18a and 18b are urged, along with the support member 32, diagonally inward of the brake disc 12 along the second path by the resilient returning force of the leaf spring 84 of the second operation means, resulting in the displacement in the direction remote from the brake disc 12 substantially by a length equivalent of y·tan $\theta$, in proportion to the displacement y, likewise the above-described.

Therefore, the stroke toward and away from the brake disc 12, of the pair of pad assemblies 18a and 18b can be set large, without increasing oil pressure thus having no likelihood of impairing the operational feeling of the brakes. As a result, upon braking a vehicle, the engagement of both pad assemblies 18a and 18b with the brake disc 12 is ensured, with the improved braking action, and upon releasing the brakes, a large clearance between the both pad assemblies 18a and 18b and the brake disc 12 is formed, with the freedom of the dragging phenomenon which would arise with a prior art brake disc. By properly selecting a ratio in diameter of the oil pressure port 65 to the oil pressure port 81 in the first and second operation means 20 and 22, a time lag in operation between respective pistons 54 and 72 is provided.

Figure 5:
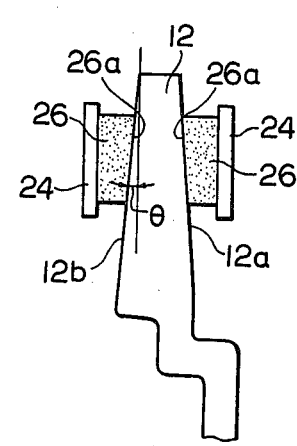
Figure 6:
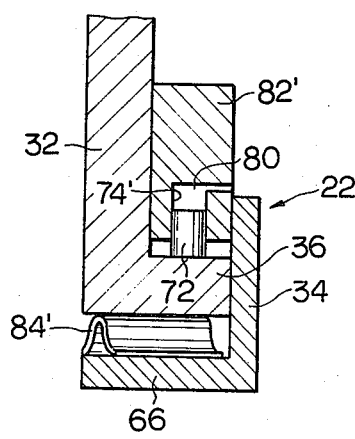
Figure 7:
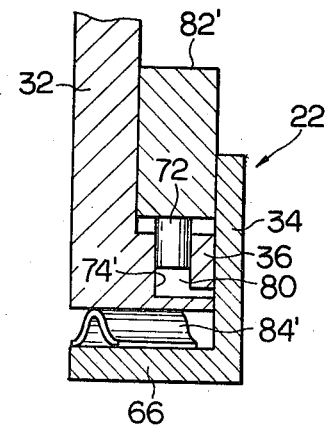

In the embodiment shown in FIGS. 1 through 4, in order to provide a angle of elevation diametrically outward of the brake disc, for each pressure bearing surface 12a(12b) of the brake disc 12, the wall thickness of the brake disc 12 is increased diametrically outward thereof. As an alternative, as shown in FIG. 5, the wall thickness of the brake disc 12 may be decreased diagonally outward thereof, thus providing an angle of depression for each pressure bearing surface 12a(12b) of the brake disc. In this case, a press surface 26a of the friction member 26 of respective pad assembly 18a(18b) need be tapered to the lower end of the pad member, so that the press surfaces 26a of respective pad members 18a and 18b may be parallel to the pressure bearing surfaces 12a and 12b of the brake disc 12. Furthermore, as shown in FIG. 6, a leaf spring 84' of the second operation means 22 is placed between the under surface of the base frame portion 36 of the support member 32 and the top surface of the base frame portion 66 of the fixing member 34. Each piston 72 is housed in a bore i.e. a cylinder 74' provided in the cover 82' in a portion directly above the base frame portion 36, so that the stroke of the piston overcomes a biasing force of the leaf spring 84', so as to urge the caliper 48 and the pad assemblies 18a and 18b, which are supported by the support member 32, diametrically inward of the brake disc 12. The cylinder 74' may be provided in the base frame portion of the support member 32, as the case may be, as shown in FIG. 7.

Figure 8:
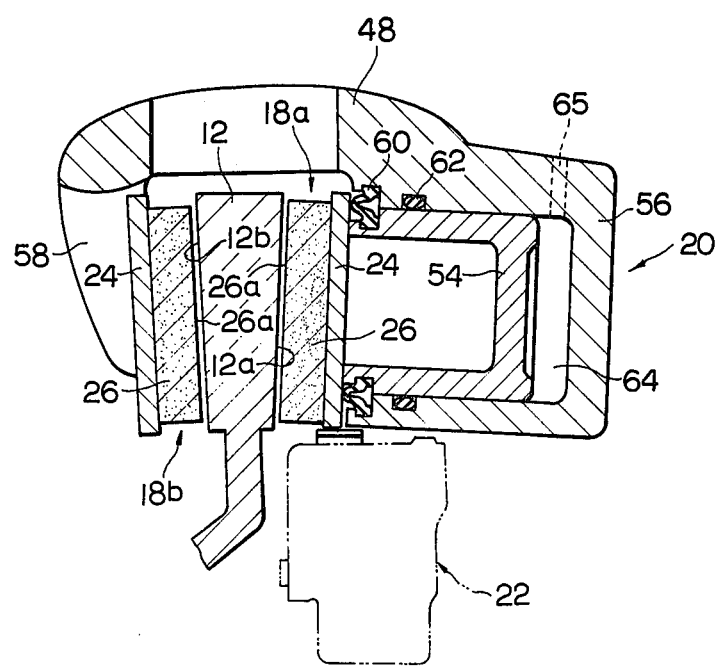
Figure 9:
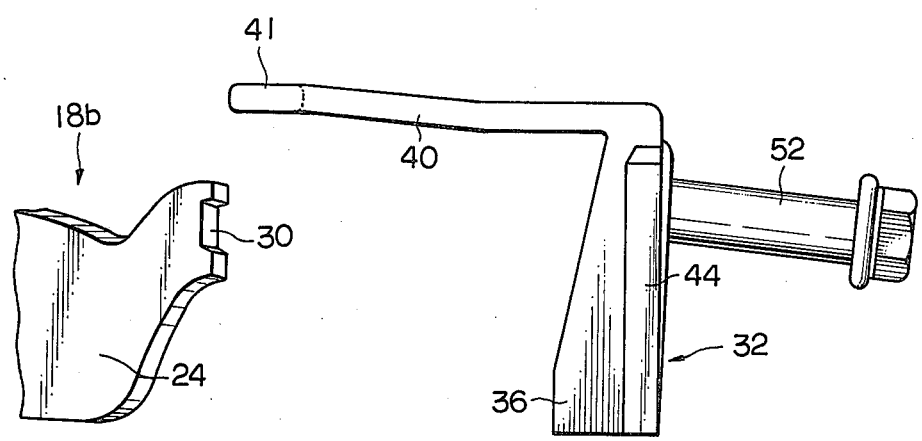

In the embodiment of FIG. 8, the wall thickness of the brake disc 12 is increased diametrically outward thereof, and in turn, the friction member 26 of each pad assembly 18a(18b) remains uniform in thickness. In this embodiment, with a view to moving respective pad assemblies 18a and 18b along the first path making a right angle with respect to the pressure bearing surfaces 12a and 12b of the brake disc 12, with their press surfaces 26a being in parallel to respective pressure bearing surfaces, the pair of guide pins 52 and the outer pad guide portions which are attached to the support member 32 are aslant, and hence the engaging recesses 30 in the outer pad assembly 18b which receive the guide portions are slanting in the side wall thereof. Furthermore, the inner pad guide grooves 42 are inclined at the side wall thereof, and hence the lug portions 28 of the inner pad assembly 18b which engage the guide grooves are inclined, although such is not shown in the drawing.

Figure 10:
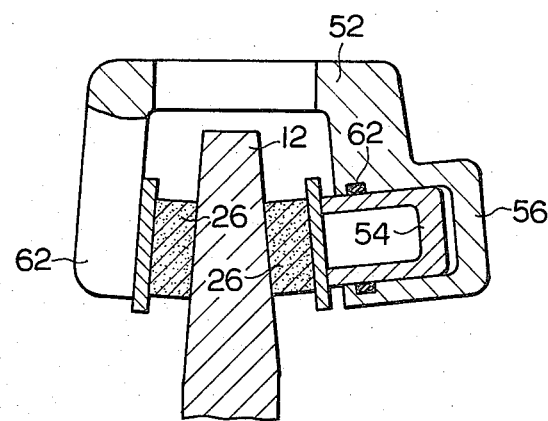

Also in the case where the wall thickness of the brake disc is decreased diagonally outward thereof, as shown in FIG. 10, the friction member 26 uniform in thickness is availed, with the same results as in the former embodiment.

Although it is common to all the embodiments so far described that the pad assemblies are disposed on the opposite sides of the brake disc, only a single pad assembly may be disposed on one side alone of the brake disc.

According to the present invention, the pad assemblies are displaced diagonally of the brake disc having the inclined pressure bearing surfaces, by the operation of the second operation means. Upon releasing the brakes, such arrangements can afford a clearance between the press surfaces of respective pad assemblies and the pressure bearing surfaces of the brake disc, which clearance is as large as a value obtained by adding the stroke of the reaction seal members of the first operation means and the stroke obtained by multiplying a tangent value of an angle of inclination $\theta$ of respective pressure bearing surfaces of the brake disc by the stroke of the second operation means. The dragging phenomenon which would arise with prior art pad assemblies is thus eliminated, fuel consumption of a vehicle is reduced, and generation of the usual sound of the brakes, the so-called a squelch groan is avoided.

We claim:
1. A disc brake comprising:
 a rotatable brake disc having a diagonally inclined circular pressure bearing surface;
 a pad assembly disposed on a side of said brake disc; and
 a first and second operation means for engaging said pad assembly with said pressure bearing surface of said disc, said first operation means displacing said pad assembly substantially parallel to the axis of rotation of said brake disc, and said second operation means displacing said pad assembly nonparallel to the axis of rotation of said brake disc.

2. A disc brake as defined in claim 1, wherein said pad assembly is disposed in opposed relation to said pressure bearing surface of said brake disc and has a press surface substantially parallel to the pressure bearing surface of the disc; said pad assembly being displaced toward said pressure bearing surface of said brake disc, thereby engaging the press surface thereof with the pressure bearing surface of the brake disc.

3. A disc brake as defined in claim 2, wherein said pad assembly is displaced along a first path substantially parallel to the axis of rotation of said brake disc by said first operation means, and displaced along a second path making a right angle to said first path by said second operation means.

4. A disc brake as defined in claim 2, wherein said pad assembly is displaced by said first operation means along the first path substantially perpendicular to said press surface thereof, and displaced by said second operation means along the second path substantially parallel to the diameter of said brake disc.

5. A disc brake comprising:
a rotatable brake disc having circular pressure bearing surfaces at the opposite sides thereof, said pressure bearing surfaces being inclined diagonally;
a pair of pad assemblies disposed on the opposite sides of said brake disc and having opposing press surfaces, respectively, said press surfaces being parallel to respective pressure bearing surfaces of said brake disc;
a support member for supporting said pair of pad assemblies slidably in parallel to the axis of rotation of said brake disc;
a first operation means being a caliper supported on said support member for displacing said pair of pad assemblies substantially parallel to the axis of rotation of said brake disc;
a fixing member for movably supporting said support member; and;
a second operation means for sliding said support member relative to said fixing member nonparallel to the axis of rotation of said brake disc.

6. A brake disc as defined in claim 5, wherein the wall thickness of said brake disc is increased diagonally outward thereof, so as to provide said inclined pressure bearing surface for each side of said brake disc; and upon braking the vehicle, said support member is shifted nonparallel to the axis of rotation of said brake disc.

7. A brake disc as defined in claim 5, wherein the wall thickness of said brake disc is decreased diagonally outward thereof, so as to define said inclined pressure bearing surface at each side of said brake disc; and upon braking the vehicle, said support member is shifted nonparallel to the axis of rotation of said brake disc.

8. A brake disc as defined in claim 5, wherein said caliper includes; a cylinder positioned on one side of said brake disc, and a pair of press portions positioned on the other side thereof, said cylinder housing therein a piston for pressing one of said pad assemblies against one surface of said brake disc, and said press portions being adapted to press the other pad assembly against the other surface of said brake disc by the reaction of said piston; and said caliper being operated in association with said operation means.

9. A disc brake as defined in claim 5, wherein said second operation means for causing the sliding movement of said support member includes cylinder bores defined in either one of said support member and said fixing member, and pistons housed in said bores sidably and engagable with the other of said support member and said fixing member; and said support member is slid by a liquid pressure supplied into said bores.

* * * * *